Jan. 26, 1926.  
S. NAKAGAWA  
1,570,701

SUN AND RAIN SHIELD FOR AUTOMOBILES

Filed May 11, 1925

INVENTOR.  
S. NAKAGAWA  
BY  
ATTORNEY.

Patented Jan. 26, 1926.

1,570,701

UNITED STATES PATENT OFFICE.

SHOICHI NAKAGAWA, OF SAN JOSE, CALIFORNIA.

SUN AND RAIN SHIELD FOR AUTOMOBILES.

Application filed May 11, 1925. Serial No. 29,301.

*To all whom it may concern:*

Be it known that I, SHOICHI NAKAGAWA, a subject of the Emperor of Japan, residing at San Jose, in the county of Santa Clara, State of California, have invented new and useful Improvements in Sun and Rain Shields for Automobiles, of which the following is a specification.

This invention relates to an improved sun and rain shield for use in connection with automobiles, the primary object being to provide a simply constructed and inexpensive shield which will serve to prevent glaring sun rays from interfering with the driver's vision and may be adjusted or extended to prevent rain and snow from blowing onto and collecting upon the windshield.

An object of the invention is to provide a sun and rain shield of the character described which may be readily attached to the ordinary automobile without requiring any change in the construction of the latter and which may be quickly adjusted to serve either as a sun shield or a rain or storm shield, said shield being so constructed that in either position it will not interfere with the driver's vision.

With the above mentioned and other objects in view, the invention consists in the novel construction and combination of parts hereinafter described, illustrated in the accompanying drawing, and set forth in the claims hereto appended, it being understood that various changes in the form, proportion, size and minor details of construction within the scope of the claims may be resorted to without departing from the spirit or sacrificing any of the advantages of the invention.

Referring to the drawing.

Figure 1:
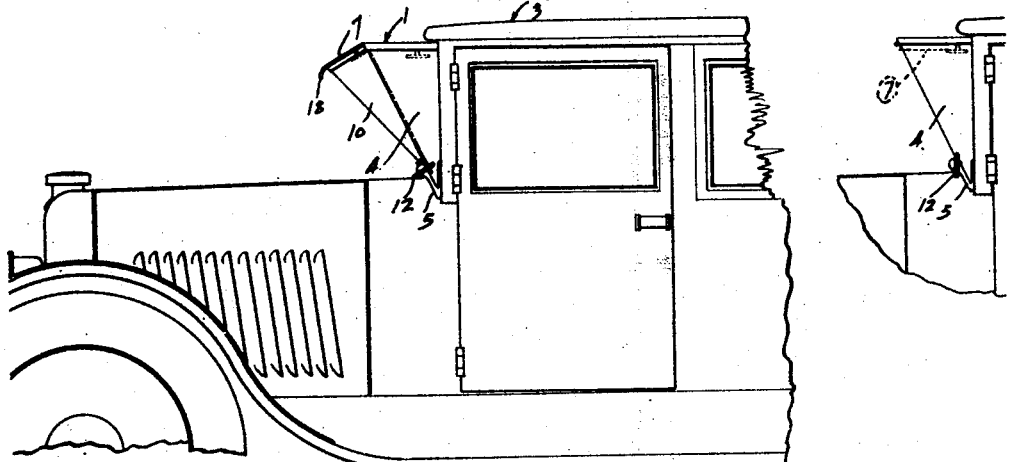
Fig. 1 represents a fragmentary side elevation of an automobile showing the device of my invention applied thereto and adjusted for use as a rain shield.

The embodiment of the invention shown in the accompanying drawing comprises a shield plate or visor 1 which is of rectangular form and adapted to be fastened in any suitable manner along one longitudinal edge to the upper portion of the windshield frame 2 of an automobile generally designated 3. This plate although preferably opaque and formed of sheet metal, may be formed of other material and does not necessarily have to be opaque. The plate 1 is secured so that it is substantially horizontally disposed in front of the windshield of the vehicle. Extending downwardly from the ends of the plate 1 are glass side shield plates 4 which are tapered or reduced towards their lower ends. These plates 4 are suitably fastened to the plate 1 at their upper ends and at their lower pointed ends are secured by brackets 5 which are fastened to the windshield frame. The glass side shields 4 prevent rain or snow from blowing sidewise onto and collecting upon the windshield of the vehicle but do not interfere with the driver's vision.

Hinged to the forward edge of the plate 1 as at 6, is a narrow, preferably metal, visor extension plate 7 which is adapted to be inclined downwardly and forwardly from the plate 1 so as to prevent the sun's rays from interfering with the driver's vision. The plate 7 while preferably formed of sheet metal may be made of any other opaque or trunslucent material which would serve to prevent the sun's rays from interfering with the driver's vision. This plate may be swung to lie beneath and close to the under side of the plate 1, under certain conditions of driving. Hinged as at 8 to the end edges of the visor plate 7 are strips 9 carrying narrow glass shields 10 which are tapered or reduced towards their lower ends and are adapted to overlie the edges of the shields 4 so as to serve as extensions thereof. These glass extension plates when not in use may be folded upwardly close to the inner side of the plate 7. When they are extended as shown in Fig. 1, the lower ends thereof carrying metal clips 11 are adapted to be engaged by fasteners 12 carried by the brackets 5. These fasteners 12 have clamping lugs 13 on their inner ends and handles 14 on their outer ends. On turning the handles, the lugs 13 are moved so as to engage the clips 11 and hold the extension plates 10 in position. The plates 10 carry narrow compressible strips 15 adjacent their rear upright edges, which strips are adapted to engage the inner sides of the plates 4 so as to provide a tight seal between the two plates and to prevent rattling thereof.

With the visor 7 arranged as shown in Fig. 1, and the plates 10 in position to serve as extensions of the plates 4, there is provided a visor which will not only act as a sun shield but will prevent rain or snow from blowing downwardly onto the windshield. The plates 4 and 10 being of glass, serve as effective shields against sidewise blowing of rain or snow onto the windshield, and do not interfere with the driver's vision when looking ahead and to either side of the vehicle.

Figure 2:
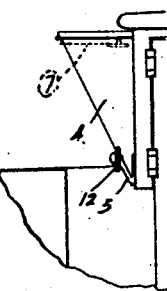
Fig. 2 represents a fragmentary side elevation of a part of an automobile showing the shield of my invention when adjusted for use as a sun shield.
Figure 3:
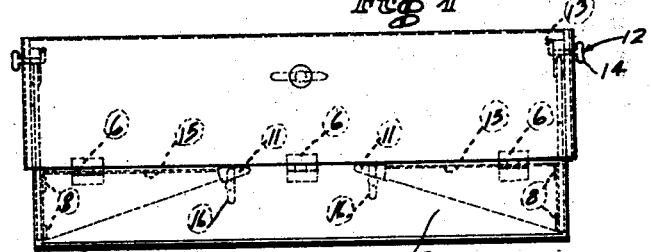
Fig. 3 represents a top plan view of the shield with the wing extensions shown in folded position in dotted lines.
Figure 6:
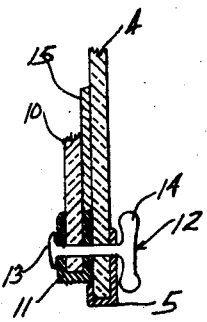
Fig. 6 represents a fragmentary vertical sectional view of a part of the shield, particularly showing the manner of clamping said wings or extensions in place.
Figure 5:
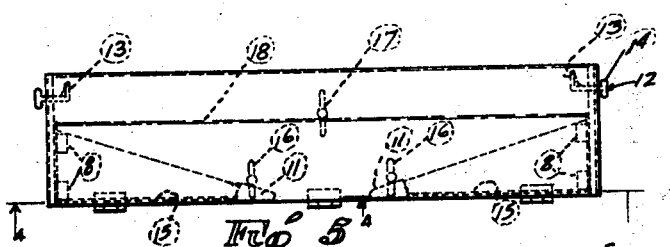
Fig. 5 represents a top plan view of the shield as when in folded position and adapted to serve as a sun shield.
Figure 4:
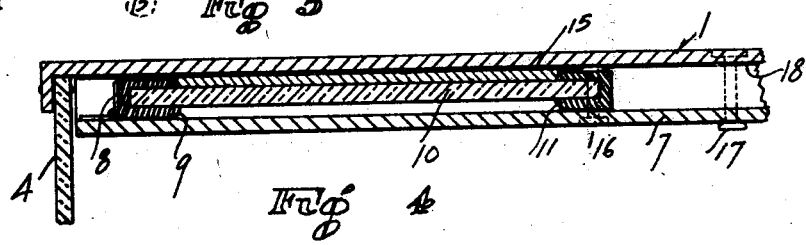
Fig. 4 represents a sectional view taken on the plane of line 4—4 of Fig. 5.

Under certain conditions of driving the plates 10 and 7 may be folded into out of the way position. To do this the clamps 12 are turned so as to release the lower ends of the plates 10 and said plates are swung upwardly into position lying close to the under side of the plate 7. By means of catches 16 mounted on the under side of the visor plate 7, the glass plates 10 may be held in folded position. On so securing the glass plates 10, the plate 7 is folded back on the under side of the main plate 1 as shown in Figs. 2, 4, and 5. A suitable catch or fastening device 17 is mounted on the under side of the plate 1 and provides for securing the plate 7 in folded position. The plate 7 at its outer edge is provided with a rounded down-turned flange 18 which is adapted to engage the under side of the plate 1 in advance of the plates 10. The clips 16 are of such a nature that the glass plates 10 are securely held and will not rattle. The strips 9 and clamps 11 come in contact with the other metal parts of the device as shown in Fig. 4 so that the glass plates 10 are spaced from the plates 1 and 7. The fasteners 16 are adapted to engage the metal clips 11 on the ends of the plates 10. With the device thus folded it appears as shown in Fig. 2 and acts as a means for preventing, to some extent, the sun's rays from interfering with the driver's vision and it further acts as a partial rain shield.

I claim:

1. A sun and rain shield for automobiles comprising a metallic plate adapted to be secured to the upper portion of a windshield of an automobile and project outwardly therefrom, glass side shields fastened to the ends of said plate and extending downwardly therefrom, metallic visor plates hinged to the forward edge of the first named plate and adapted to be moved into position inclining downwardly and forwardly from said plate into position folded against the under side of the plate and vice versa, and glass extension plates for the side shields hinged at their upper ends to the metallic extension plate and movable from a position extending outwardly from the stationary glass plates into position folded upon the under side of the metallic extension plate and vice versa.

2. A sun and rain shield for automobiles comprising a metallic plate adapted to be secured to the upper portion of a windshield of an automobile and project outwardly therefrom, glass side shields fastened to the ends of said plate and extending downwardly therefrom, metallic visor plates hinged to the forward edge of the first named plate and adapted to be moved into position inclining downwardly and forwardly from said plate into position folded against the under side of the plate and vice versa, glass extension plates for the side shields hinged at their upper ends to the metallic extension plate and movable from a position extending outwardly from the stationary glass plates into position folded upon the under side of the metallic extension plate and vice versa, means for clamping the side glass extension plates in either position and means for clamping the metallic extension plate with the glass plates folded thereon in folded position against the under side of the first named plate.

3. A sun and rain shield for automobiles comprising a visor plate adapted to be fastened to the upper end of a windshield of an automobile and to extend forwardly therefrom, a visor extension plate hinged to the forward edge of the visor and arranged to be moved from position extending downwardly and forwardly therefrom into position folded upon the under side thereof and vice versa, means for clamping said extension plate in position extending beneath the visor, glass side plates attached to the ends of the visor and extending downwardly therefrom, glass extension plates hinged at their upper ends to the visor extension and adapted to be moved from a position lying underneath the visor extension plates and means for clamping the glass extension plates in folded and extended positions.

SHOICHI NAKAGAWA.